(12) United States Patent
Morimoto et al.

(10) Patent No.: US 12,265,306 B2
(45) Date of Patent: Apr. 1, 2025

(54) LIGHT ADJUSTMENT DEVICE

(71) Applicant: Japan Display Inc., Tokyo (JP)

(72) Inventors: Hiroya Morimoto, Tokyo (JP); Shunpei Takeuchi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/349,190

(22) Filed: Jul. 10, 2023

(65) Prior Publication Data

US 2024/0019742 A1   Jan. 18, 2024

(30) Foreign Application Priority Data

Jul. 12, 2022   (JP) .................... 2022-112033

(51) Int. Cl.
*G02F 1/1347* (2006.01)
*G02F 1/1337* (2006.01)
*G02F 1/1339* (2006.01)
*G02F 1/1343* (2006.01)

(52) U.S. Cl.
CPC .......... *G02F 1/1347* (2013.01); *G02F 1/1337* (2013.01); *G02F 1/1339* (2013.01); *G02F 1/134309* (2013.01)

(58) Field of Classification Search
CPC ............. G02F 1/134309; G02F 1/1339; G02F 1/1337; G02F 1/1347
See application file for complete search history.

(56) References Cited

U.S. PATENT DOCUMENTS

| | | | | |
|---|---|---|---|---|
| 6,636,192 | B1 * | 10/2003 | Saitoh | G02F 1/1339 345/87 |
| 6,894,758 | B1 * | 5/2005 | Hagiwara | G02F 1/13452 349/151 |
| 2021/0405445 | A1 | 12/2021 | Ohira et al. | |
| 2023/0236457 | A1 * | 7/2023 | Bertin-Mourot | G02F 1/1347 349/123 |

FOREIGN PATENT DOCUMENTS

JP   2020-149021 A   9/2020

* cited by examiner

*Primary Examiner* — Mariam Qureshi
(74) *Attorney, Agent, or Firm* — XSENSUS LLP

(57) ABSTRACT

A light adjustment device includes a panel unit including a plurality of light adjustment panels stacked in a first direction. The light adjustment panels each include a first substrate, a second substrate overlapping the first substrate in a first direction, a first alignment film provided on the first substrate, a second alignment film provided on the second substrate and overlapping the first alignment film in the first direction, a liquid crystal layer filling a gap between the first alignment film and the second alignment film, a seal material provided between the first substrate and the second substrate and on the outer side of the first alignment film and the second alignment film, and a conductive member providing conduction between a first electrode provided on the first substrate and a second electrode provided on the second substrate.

5 Claims, 9 Drawing Sheets

FIG.2
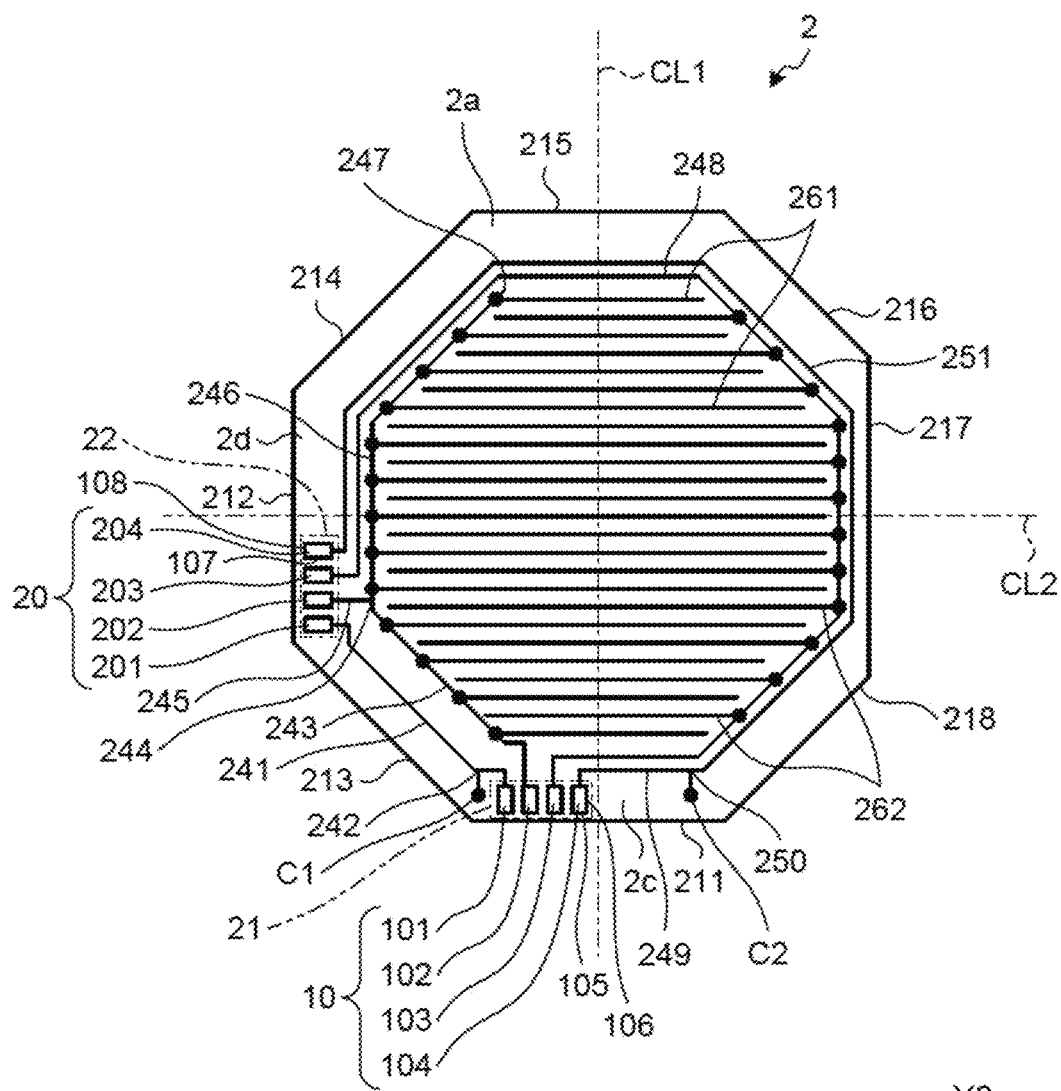
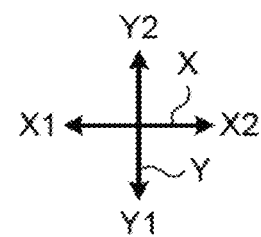

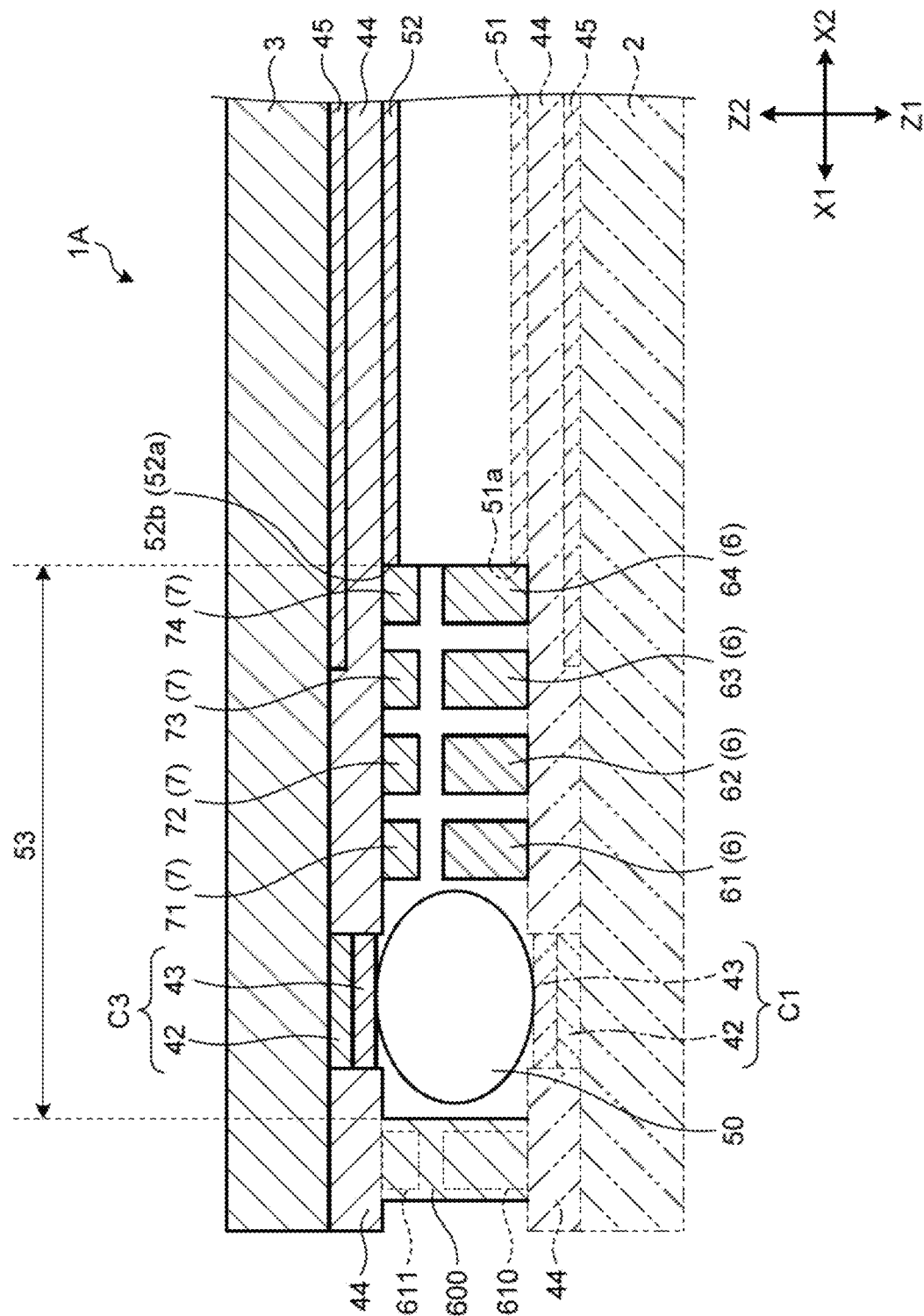

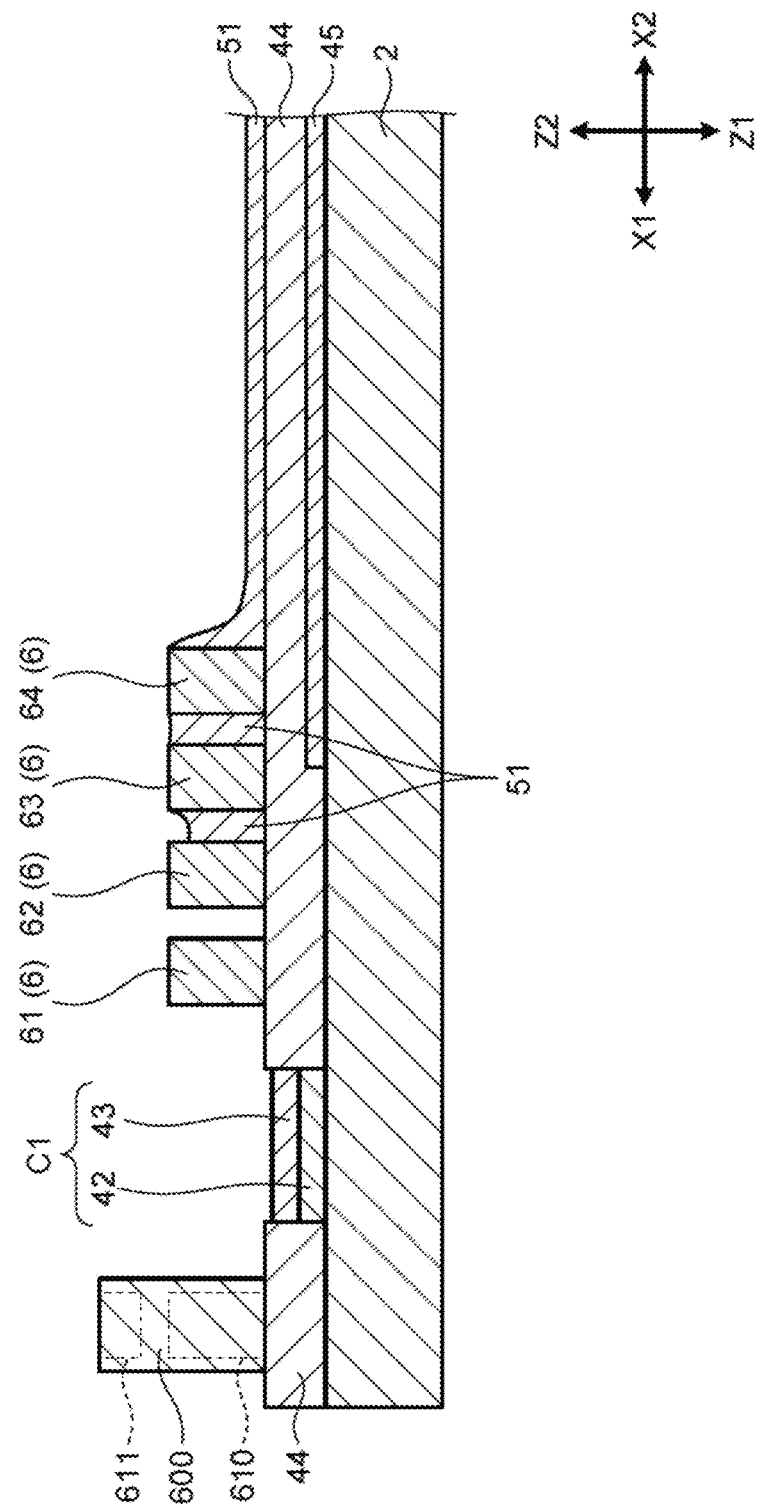

LIGHT ADJUSTMENT DEVICE

CROSS-REFERENCE TO RELATED APPLICATION

This application claims the benefit of priority from Japanese Patent Application No. 2022-112033 filed on Jul. 12, 2022, the entire contents of which are incorporated herein by reference.

BACKGROUND

1. Technical Field

The present disclosure relates to a light adjustment device.

2. Description of the Related Art

A light adjustment device including a substrate on which electrodes are provided and conductive pillars electrically coupled to the electrodes has been publicly known (refer to Japanese Patent Application Laid-open Publication No. 2020-149021 (JP-A-2020-149021), for example). Specifically, the light adjustment device includes, for example, a first substrate, a second substrate, a seal material provided between the first substrate and the second substrate, a first alignment film provided on the first substrate, a second alignment film provided on the second substrate, a liquid crystal layer provided between the first alignment film and the second alignment film, and a conductive pillar electrically coupling an electrode on the first substrate and an electrode on the second substrate. The conductive pillar is disposed on the outer side of the seal material.

The area of an effective region (active area) in which the liquid crystal layer is provided potentially decreases when the conductive member is positioned on the outer side of the seal material.

SUMMARY

The present disclosure is intended to provide a light adjustment device having a larger area of an effective region (active area).

A light adjustment device according to an embodiment of the present disclosure includes a panel unit including a plurality of light adjustment panels stacked in a first direction. The light adjustment panels each include a first substrate, a second substrate overlapping the first substrate in a first direction, a first alignment film provided on the first substrate, a second alignment film provided on the second substrate and overlapping the first alignment film in the first direction, a liquid crystal layer filling a gap between the first alignment film and the second alignment film, a seal material provided between the first substrate and the second substrate and on the outer side of the first alignment film and the second alignment film, and a conductive member providing conduction between a first electrode provided on the first substrate and a second electrode provided on the second substrate, and the conductive member is positioned on the inner side of the seal material and on the outer side of the first alignment film and the second alignment film.

BRIEF DESCRIPTION OF THE DRAWINGS

FIG. 2 is a schematic diagram of the front surface of a first substrate according to the first embodiment when viewed from the upper side;

FIG. 9 is a sectional view taken along line IX-IX in FIG. 8; and

FIG. 10 is a schematic sectional view for description of a process of forming an alignment film according to the second embodiment.

DETAILED DESCRIPTION

Figure 1:
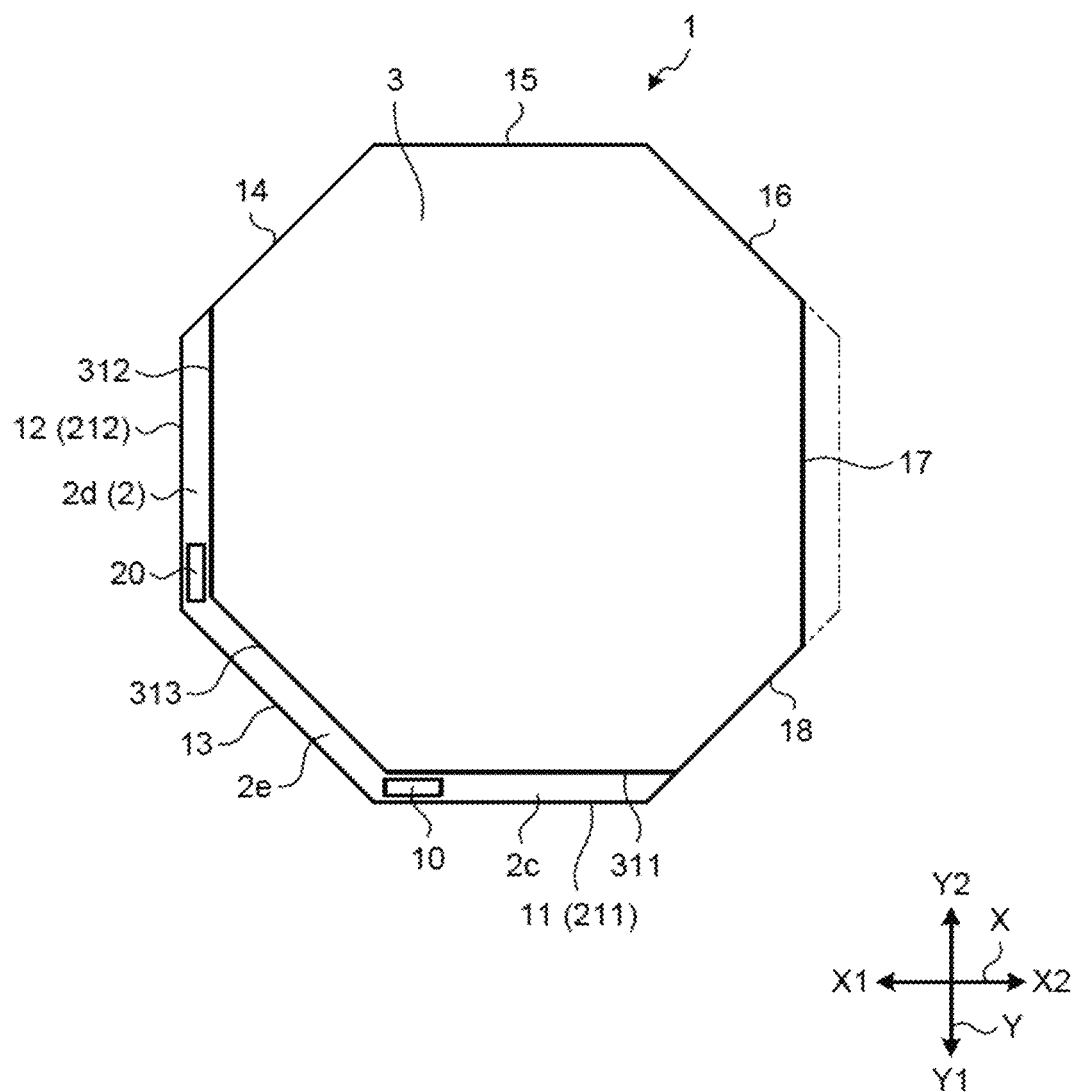
FIG. 1 is a schematic diagram of a light adjustment panel according to a first embodiment when viewed from the upper side.

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

In an XYZ coordinate system illustrated in the drawings, an X direction is the right-left direction, and an X1 side is opposite an X2 side. The X1 side is also referred to as a left side, and the X2 side is also referred to as a right side. A Y direction is the front-back direction, and a Y1 side is opposite a Y2 side. The Y1 side is also referred to as a front side, and the Y2 side is also referred to as a back side. A Z direction is the up-down direction (stacking direction). A Z1 side is opposite a Z2 side. The Z2 side is also referred to as an upper side, and the Z1 side is also referred to as a lower side. The Z direction is also referred to as a first direction.

First Embodiment

Figure 3:
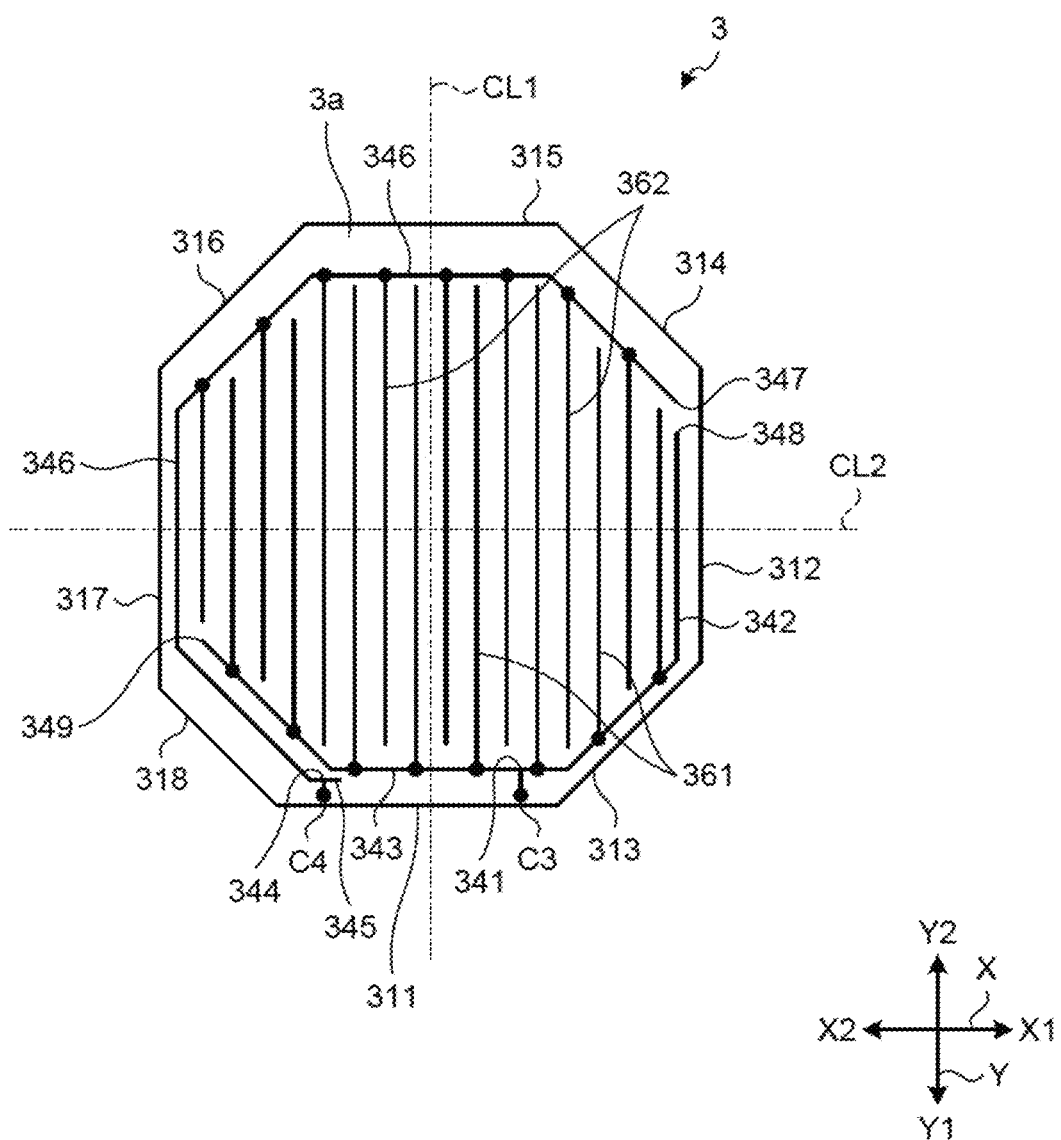
FIG. 3 is a schematic diagram illustrating the front surface of a second substrate according to the first embodiment when placed upside down, the front surface being a surface on which wires are provided.

The following first describes a light adjustment panel 1. FIG. 1 is a schematic diagram of a light adjustment panel according to a first embodiment when viewed from the upper side. FIG. 2 is a schematic diagram of the front surface of a first substrate according to the first embodiment when viewed from the upper side. FIG. 3 is a schematic diagram illustrating the front surface of a second substrate according to the first embodiment when placed upside down, the front surface being a surface on which wires are provided.

As illustrated in FIG. 1, the light adjustment panel 1 includes a first substrate 2 and a second substrate 3 disposed on the upper side (Z1 side) of the first substrate 2. The light adjustment panel 1 has an octagonal shape in a plan view and has a first side 11, a second side 12, a third side 13, a fourth side 14, a fifth side 15, a sixth side 16, a seventh side 17, and an eighth side 18. The seventh side 17 of the light adjustment panel 1 is displaced to the X1 side relative to a regular octagonal shape. Specifically, in FIG. 1, a dashed and double-dotted line is a virtual line representing the seventh side 17 as part of a regular octagonal shape, and the seventh side 17 is positioned on the X1 side of the dashed and double-dotted line. The shape of the light adjustment panel 1 in the present invention is not particularly limited, but the present invention includes the light adjustment panel 1 in a polygonal shape other than an octagonal shape, a circular shape, and an elliptical shape.

The first side 11 is positioned on the Y1 side on the light adjustment panel 1. The first side 11 is parallel to the X direction in FIG. 1. The first side 11 of the light adjustment panel 1 matches a first side 211 of the first substrate 2 illustrated in FIG. 2. However, a first side 311 of the second substrate 3 illustrated in FIG. 3 is positioned on the Y2 side of the first side 211 of the first substrate 2. Thus, as illustrated in FIG. 1, an end part 2c of the first substrate 2 on the Y1 side is exposed when the second substrate 3 is stacked on the upper side of the first substrate 2. A first terminal group 10 is provided at the end part 2c.

The second side 12 is positioned on the X1 side on the light adjustment panel 1. The second side 12 is parallel to the Y direction in FIG. 1. The second side 12 of the light adjustment panel 1 matches a second side 212 of the first substrate 2 illustrated in FIG. 2. However, a second side 312 of the second substrate 3 illustrated in FIG. 3 is positioned on the X2 side of the second side 212 of the first substrate 2. Thus, as illustrated in FIG. 1, an end part 2d of the first substrate 2 on the X1 side is exposed when the second substrate 3 is stacked on the upper side of the first substrate 2. A second terminal group 20 is provided at the end part 2d.

The third side 13 intersects both the X1 direction and the Y1 direction. The angle of the intersection is 45°. The third side 13 matches a third side 213 of the first substrate 2 illustrated in FIG. 2. However, a third side 313 of the second substrate 3 illustrated in FIG. 3 is positioned on the X2 and Y2 sides of the third side 213 of the first substrate 2. In other words, the third side 313 of the second substrate 3 is positioned on a center C side of the third side 213 of the first substrate 2 in a plan view. Thus, as illustrated in FIG. 1, an end part 2e of the first substrate 2 is exposed when the second substrate 3 is stacked on the upper side of the first substrate 2.

The fourth side 14 intersects both the X1 direction and the Y2 direction. The angle of the intersection is 45°. The fourth side 14 overlaps a fourth side 214 of the first substrate 2 illustrated in FIG. 2 and a fourth side 314 of the second substrate 3 illustrated in FIG. 3. The fifth side 15 is positioned on the Y2 side on the light adjustment panel 1. The fifth side 15 overlaps a fifth side 215 of the first substrate 2 illustrated in FIG. 2 and a fifth side 315 of the second substrate 3 illustrated in FIG. 3.

The sixth side 16 intersects both the X2 direction and the Y2 direction. The angle of the intersection is 45°. The sixth side 164 overlaps a sixth side 216 of the first substrate 2 illustrated in FIG. 2 and a sixth side 316 of the second substrate 3 illustrated in FIG. 3.

The seventh side 17 is positioned on the X2 side on the light adjustment panel 1. The seventh side 17 overlaps a seventh side 217 of the first substrate 2 illustrated in FIG. 2 and a seventh side 317 of the second substrate 3 illustrated in FIG. 3.

The eighth side 18 intersects both the X2 direction and the Y1 direction. The angle of the intersection is 45°. The eighth side 18 overlaps an eighth side 218 of the first substrate 2 illustrated in FIG. 2 and an eighth side 318 of the second substrate 3 illustrated in FIG. 3.

Accordingly, the area of the second substrate 3 is smaller than the area of the first substrate 2, and thus the first terminal group 10 provided at the end part 2c of the first substrate 2 and the second terminal group 20 provided at the end part 2d thereof are exposed.

The following describes the first substrate 2 and the second substrate 3 with reference to FIGS. 2 and 3. FIG. 3 is a schematic diagram illustrating a front surface 3a as a surface on which wires are provided among the front and back surfaces of the second substrate 3. Accordingly, the orientations of the X1 and X2 directions for the second substrate 3 in FIG. 3 are opposite the orientations of the X1 and X2 directions for the first substrate 2 in FIG. 2.

FIG. 2 illustrates a central line CL1 extending in the Y direction through the center of the first substrate 2 in the X direction, and a central line CL2 extending in the X direction through the center of the first substrate 2 in the Y direction.

As illustrated in FIG. 2, at the end part 2c along the first side 211 of the first substrate 2, the first terminal group 10 is provided at a first end part 21 (illustrated with dashed and double-dotted lines) on a side closer to the second side 212 (or the third side 213) than the center of the first side 211. Specifically, the end part 2c is an end part of the first substrate 2 on the Y1 side, and the first end part 21 illustrated with dashed and double-dotted lines is disposed at a site of the end part 2c on the X1 side of the central line CL1. The first terminal group 10 is provided at the first end part 21. As illustrated in FIG. 2, the first terminal group 10 includes a first terminal 101, a second terminal 102, a third terminal 103, and a fourth terminal 104. The first terminal 101, the second terminal 102, the third terminal 103, and the fourth terminal 104 are sequentially arranged from the X1 side toward the X2 side in the X direction (fourth direction).

The terminals 101, 102, 103, and 104 each have a pair of short sides 105 parallel to the first side 211 and a pair of long sides 106 parallel to the second side 212.

In addition, as illustrated in FIG. 2, at the end part 2d along the second side 212 of the &first& substrate 2, the second terminal group 20 is provided at a second end part 22 (illustrated with dashed and double-dotted lines) on the first side 211 side (or the third side 213 side) of the center of the second side 212. Specifically, the end part 2d is an end part of the first substrate 2 on the X1 side, and the second end part 22 illustrated with dashed and double-dotted lines is disposed at a site of the end part 2d on the Y1 side of the central line CL2. The second terminal group 20 is provided at the second end part 22.

As illustrated in FIG. 2, the second terminal group 20 includes a fifth terminal 201, a sixth terminal 202, a seventh terminal 203, and an eighth terminal 204. The fifth terminal 201, the sixth terminal 202, the seventh terminal 203, and the eighth terminal 204 are sequentially arranged from the Y1 side toward the Y2 side in the front-back direction (Y direction). The terminals 201, 202, 203, and 204 each have a pair of long sides 107 parallel to the first side 211 and a pair of short sides 108 parallel to the second side 212.

The following describes wires on the first substrate 2 and the second substrate 3. Wires are provided on the front surface of each substrate among the front and back surfaces thereof. In other words, a surface on which wires are provided is referred to as the front surface, and a surface opposite to the front surface is referred to as the back surface.

As illustrated in FIG. 2, wires, liquid crystal drive electrodes, and coupling portions are provided on a front surface 2a of the first substrate 2. A coupling portion C1 of the first substrate 2 and a coupling portion C3 (refer to FIG. 3) of the second substrate 3 are electrically coupled to each other through a conductive member (not illustrated) through which conduction is possible. Similarly, a coupling portion C2 of the first substrate 2 and a coupling portion C4 (refer to FIG. 3) of the second substrate 3 are electrically coupled to each other through a common electrode (not illustrated) through which conduction is possible.

The first terminal 101 and the fifth terminal 201 are electrically coupled to each other through a wire (first wire) 241. A bifurcation point 242 is provided halfway through the wire 241, and a wire extends from the bifurcation point 242 to the coupling portion C1.

The second terminal 102 and the sixth terminal 202 are electrically coupled to each other through wires (second wires) 243 and 245. A bifurcation point 244 is provided on the wire 243, and a wire 246 extends from the bifurcation point 244 to an end 247.

The third terminal 103 and the seventh terminal 203 are electrically coupled to each other through a wire (third wire) 248. The fourth terminal 104 and the eighth terminal 204 are electrically coupled to each other through wires (fourth wires) 249 and 251. The wire 249 extends up to a bifurcation point 250 from the fourth terminal 104 toward the X2 side. The wire 251 extends from the bifurcation point 250 to the eighth terminal 204. A wire extends from the bifurcation point 250 to the coupling portion C2.

A plurality of liquid crystal drive electrodes 261 are coupled to the wires 243 and 246. The liquid crystal drive electrodes 261 extend straight in the X direction. The liquid crystal drive electrodes 261 are disposed at equal intervals in the Y direction.

A plurality of liquid crystal drive electrodes 262 are coupled to the wire 248. The liquid crystal drive electrodes 262 extend straight in the X direction. The liquid crystal drive electrodes 262 are disposed at equal intervals in the Y direction. The liquid crystal drive electrodes 261 and 262 are alternately arranged in the Y direction.

As illustrated in FIG. 3, wires, liquid crystal drive electrodes, and coupling portions are provided on the front surface 3a of the second substrate 3. Central lines CL1 and CL2 illustrated in FIG. 3 correspond to the central lines CL1 and CL2 illustrated in FIG. 2.

The coupling portion C3 is coupled to wires 342 and 343 through a bifurcation point 341. The wire 342 extends to an end 348. The wire 343 extends to an end 349. The coupling portion C4 is coupled to wires 345 and 346 through a bifurcation point 344. The wire 346 extends to an end 347.

A plurality of liquid crystal drive electrodes 361 are coupled to the wires 342 and 343. The liquid crystal drive electrodes 361 extend straight in the Y direction. The liquid crystal drive electrodes 361 are disposed at equal intervals in the X direction.

A plurality of liquid crystal drive electrodes 362 are coupled to the wire 346. The liquid crystal drive electrodes 362 extend straight in the Y direction. The liquid crystal drive electrodes 362 are disposed at equal intervals in the X direction. The liquid crystal drive electrodes 361 and 362 are alternately arranged in the X direction.

Figure 4:
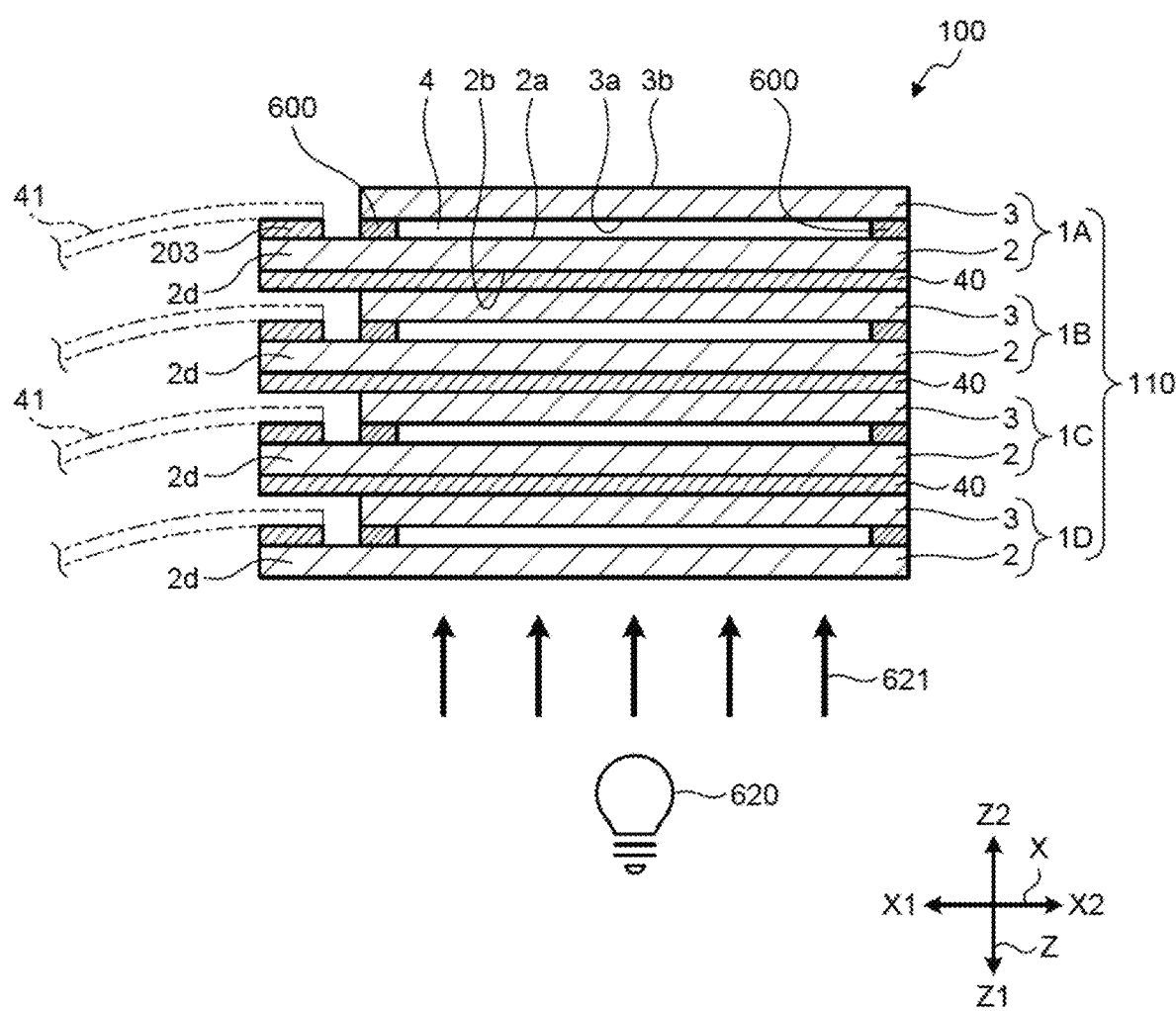
FIG. 4 is a schematic diagram illustrating a section of a light adjustment device of the first embodiment.

The following describes a light adjustment device of an embodiment. FIG. 4 is a schematic diagram illustrating a section of a light adjustment device of the first embodiment.

As illustrated in FIG. 4, a light adjustment device 100 according to the first embodiment includes a panel unit 110 and a light source 620. In the light adjustment device 100 according to the present embodiment, a liquid crystal cell for p-wave polarized light and a liquid crystal cell for s-wave polarized light are stacked and combined.

The panel unit 110 is formed by stacking a plurality of light adjustment panels 1 in the Z direction (first direction). In the present embodiment, a plurality (in the embodiment, four) of light adjustment panels 1 illustrated in FIG. 1 are stacked. Specifically, as illustrated in FIG. 4, the four light adjustment panels 1 are a first light adjustment panel 1A, a second light adjustment panel 1B, a third light adjustment panel 1C, and a fourth light adjustment panel 1D sequentially stacked from the upper side. The first light adjustment panel 1A is disposed uppermost among the four light adjustment panels 1.

In other words, the first light adjustment panel 1A is positioned closest to the Z2 side among the light adjustment panels. The fourth light adjustment panel 1D is disposed lowermost among the four light adjustment panels 1. In other words, the fourth light adjustment panel 1D is positioned closest to the Z1 side among the light adjustment panels. The second light adjustment panel 1B and the third light adjustment panel 1C are stacked between the first light adjustment panel 1A and the fourth light adjustment panel 1D. The light adjustment panels 1A, 1B, 1C, and 1D are bonded to each other through a bonding layer 40. Accordingly, all light adjustment panels adjacent to each other in the Z direction are bonded to each other through the bonding layer 40. For example, a back surface 2b of the first substrate 2 of the light adjustment panel 1A and a back surface 3b of the second substrate 3 of the light adjustment panel 1B are bonded to each other through the bonding layer 40. A flexible printed board 41 is electrically coupled to a terminal. The number of the light adjustment panels 1 included in the light adjustment device 100 is not limited to four but only needs to two or more. The light source 620 is disposed on the Z1 side of the panel unit 110. Light 621 is irradiated from the light source 620.

Figure 5:
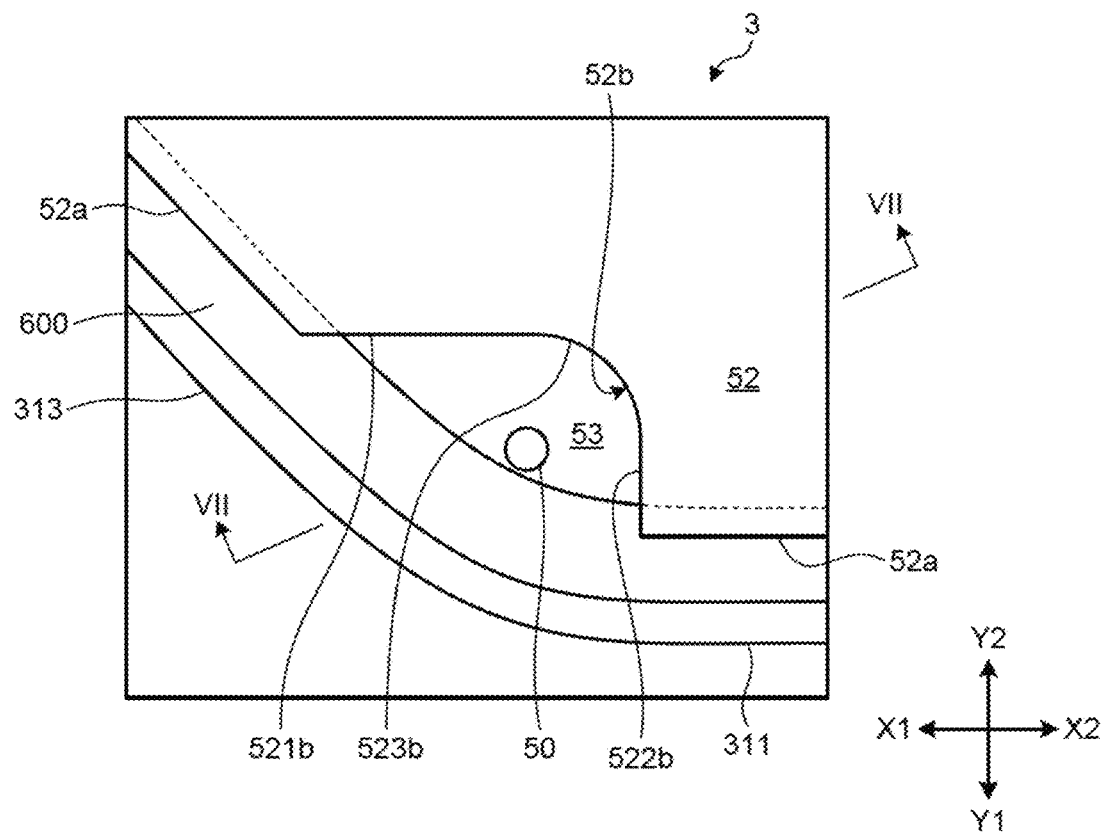
FIG. 5 is an enlarged schematic diagram of part of FIG. 3.
Figure 6:
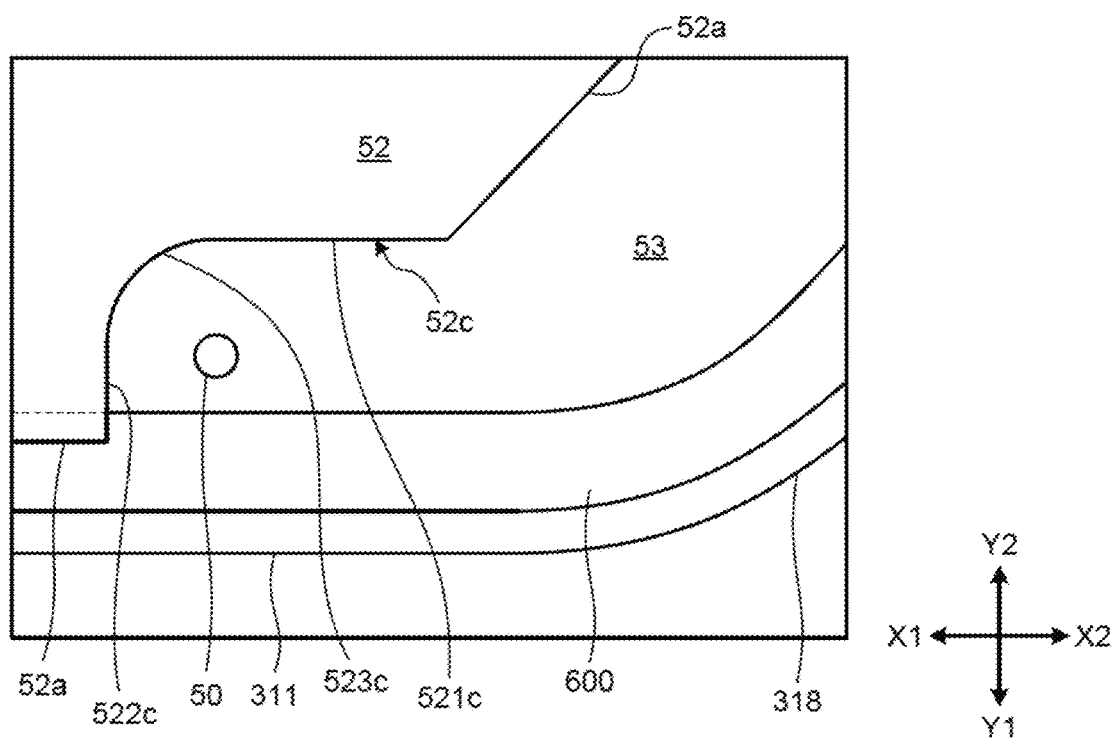
FIG. 6 is an enlarged schematic diagram of part of FIG. 3.
Figure 7:
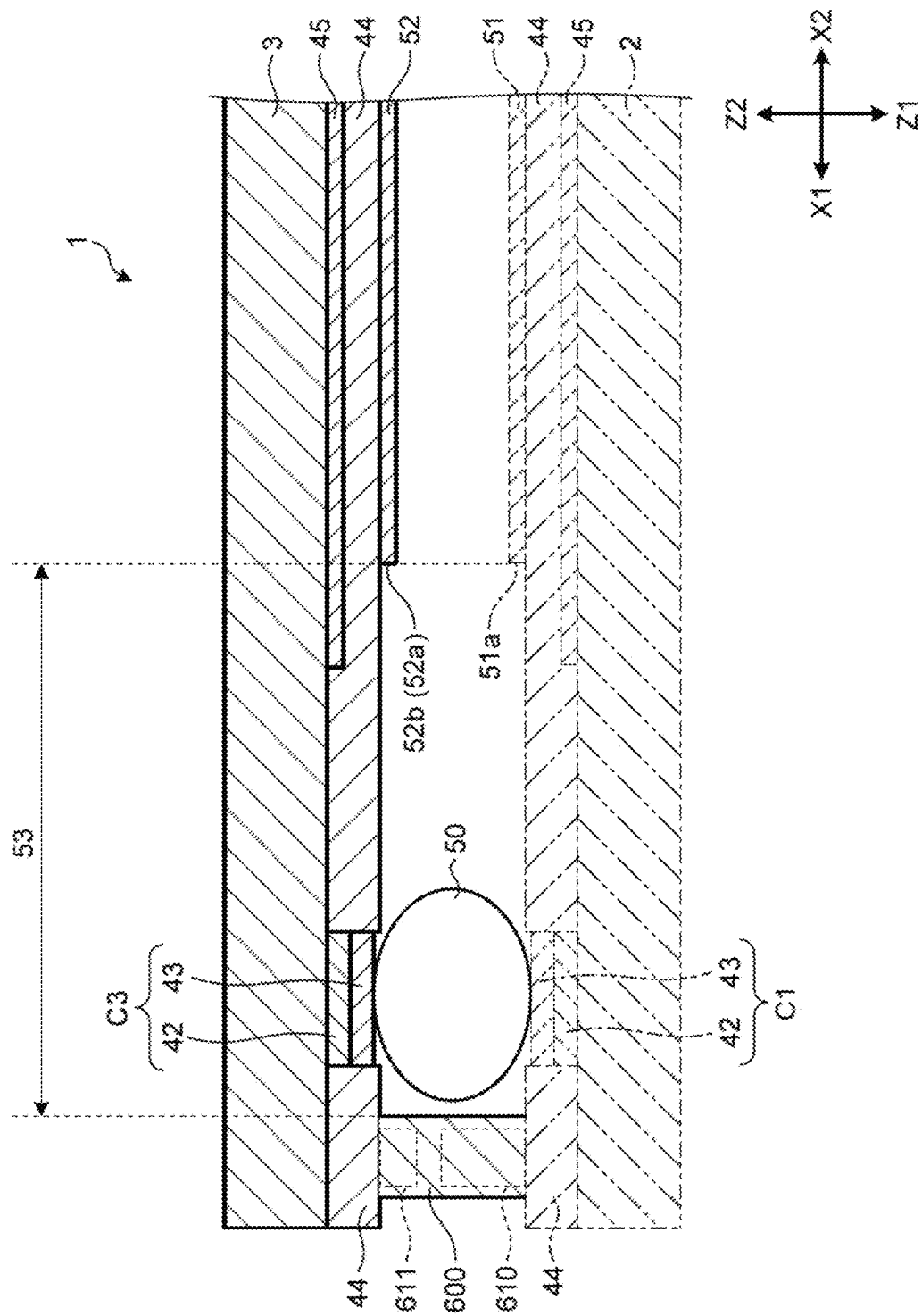
FIG. 7 is a sectional view taken along line VII-VII in FIG. 5.

The following describes a conductive member provided at a corner of the light adjustment panel 1 in detail. FIGS. 5 and 6 are enlarged schematic diagrams of part of FIG. 3. FIG. 7 is a sectional view taken along line VII-VII in FIG. 5.

As illustrated in FIGS. 5 and 7, the light adjustment panel 1 includes the first substrate 2, the second substrate 3, a seal material 600, a first alignment film 51, a second alignment film 52, and a conductive member 50.

As illustrated in FIGS. 5 and 7, the seal material 600 is provided between the first substrate 2 and the second substrate 3. As illustrated in FIG. 5, the seal material 600 extends along the sides 313 and 311. As illustrated in FIG. 7, the seal material 600 is disposed between an insulating film 44 provided at an end part of the first substrate 2 and an insulating film 44 provided at an end part of the second substrate 3. Each insulating film 44 may be an inorganic insulating layer such as silicon nitride (SiN). Spacers 610 and 611 are provided inside the seal material 600. The spacers 610 and 611 may be, for example, a photo-spacer (PS material) or a metal film provided in a photolithography process. Only any one of the spacers 610 and 611 may be formed.

As illustrated in FIG. 7, a translucent electrode 45 is provided on the first substrate 2. The translucent electrode 45 is a translucent conductive material such as indium tin oxide (ITO). An insulating film 44 is provided on the translucent electrode 45. The first alignment film 51 is provided on the insulating film 44. The first alignment film 51 extends in the X direction. The first alignment film 51 is made of, for example, polyimide (PI). Such an alignment film is provided to control the orientations of liquid crystal molecules when the liquid crystal molecules need to be arranged in one direction across a certain large area.

As illustrated in FIG. 7, a translucent electrode 45 is provided on the second substrate 3 (the Z1 side of the second substrate 3). An insulating film 44 is provided on the translucent electrode 45 (the Z1 side of the translucent electrode 45). The second alignment film 52 is provided on the insulating film 44. The second alignment film 52 extends in the X direction. The second alignment film 52 overlaps the first alignment film 51 in the Z direction. The second alignment film 52 is made of, for example, polyimide (PI). A liquid crystal layer 4 (refer to FIG. 4) is provided between the first alignment film 51 and the second alignment film 52.

As illustrated in FIG. 5, the second alignment film 52 has an edge 52a. The edge 52a extends along the side 313 (second side) and the side 311 (first side). The edge 52a has a first edge 52b. Specifically, the first edge 52b that is recessed inward is included in part of the edge 52a. As illustrated in FIG. 5, the first edge 52b includes a first site 521b extending in the X direction, a second site 522b extending in the Y direction, and an intersection portion 523b where the first site 521b intersects the second site 522b. The intersection portion 523b is curved in a circular arc shape. Specifically, the intersection portion 523b extends along a circular arc shape centered at the conductive member 50.

The edge 52a of the second alignment film 52 includes the first edge 52b that is recessed inward away from the seal material 600. A gap portion 53 where the second alignment film 52 is not disposed is provided between the first edge 52b and the seal material 600. The conductive member 50 is positioned at the gap portion 53 when viewed in the Z direction. In this manner, the gap portion 53 and the conductive member 50 are disposed at a corner where the side 311 (first side) intersects the side 313 (second side). The distance (minimum distance) between the conductive member 50 and the seal material 600 is shorter than the distance (minimum distance) between the conductive member 50 and the first edge 52b.

As illustrated in FIG. 7, the second alignment film 52 overlaps the first alignment film 51 in the Z direction. Specifically, the edge of the second alignment film 52 substantially matches the edge of the first alignment film 51. More specifically, the edge of the first alignment film 51 includes a first edge 51a, and the first edge 51a is arranged alongside the first edge 52b of the second alignment film 52 in the X direction. In other words, the first edge 51a substantially matches the first edge 52b when viewed in the Z direction.

The coupling portion (first electrode) C1 is provided on the first substrate 2, and the coupling portion (second electrode) C3 is provided on the second substrate 3. The coupling portion C1 and the coupling portion C3 are electrically coupled to each other through the conductive member 50. The coupling portion C1 is also referred to as a first electrode. The coupling portion C1 includes a metal layer 42 on the first substrate 2, and a conductive layer 43 on the metal layer 42. The coupling portion C3 is also referred to as a second electrode. The conductive layer 43 is a translucent conductive material such as ITO. The coupling portion C3 includes a metal layer 42 on the second substrate 3, and a conductive layer 43 on the metal layer 42. The conductive member 50 has a substantially sphere shape or an oblate sphere shape. An oblate sphere is a body of revolution obtained by rotating an ellipse about a rotational axis at the minor axis of the ellipse. The conductive member 50 contacts both the coupling portion C1 and the coupling portion C3. Accordingly, the coupling portion C1 is electrically coupled to the coupling portion C3 through the conductive member 50. In the present invention, the conductive member 50 is not limited to a body of revolution. The conductive member 50 may be, for example, a seal material containing conductive paste or conductive material, or a material containing a photo-spacer.

In addition, as illustrated in FIG. 6, another gap portion 53 and another conductive member 50 are provided at a corner of the second substrate 3 where the side 311 intersects the side 318. As illustrated in FIG. 6, the second alignment film 52 has an edge 52a at a corner where the side 311 intersects the side 318. The edge 52a extends along the sides 311 and 318. The edge 52a includes a first edge 52c. Specifically, the first edge 52c that is recessed inward is included in part of the edge 52a. As illustrated in FIG. 6, the first edge 52c includes a first site 521c extending in the X direction, a second site 522c extending in the Y direction, and an intersection portion 523c where the first site 521c intersects the second site 522c.

The intersection portion 523c is curved in a circular arc shape. Specifically, the intersection portion 523c extends along a circular arc shape centered at the conductive member 50. In this manner, the edge 52a of the second alignment film 52 includes the first edge 52c separated from the seal material 600 toward the inner side. The gap portion 53 where the second alignment film 52 is not disposed is provided between the first edge 52c and the seal material 600. The conductive member 50 is positioned at the gap portion 53 when viewed in the Z direction. The distance (minimum distance) between the conductive member 50 and the seal material 600 is shorter than the distance (minimum distance) between the conductive member 50 and the first edge 52c.

As described above, the light adjustment device 100 according to the first embodiment includes the panel unit 110 including a plurality of light adjustment panels 1 stacked in the Z direction (first direction). The light adjustment panel 1 includes the first substrate 2, the second substrate 3 overlapping the first substrate 2, the first alignment film 51 provided on the first substrate 2, the second alignment film 52 provided on the second substrate 3 and overlapping the first alignment film 51 in the Z direction (first direction), the liquid crystal layer 4 filling a gap between the first alignment film 51 and the second alignment film 52, the seal material 600 provided between the first substrate 2 and the second substrate 3 and on the outer side of the first alignment film 51 and the second alignment film 52, and each conductive member 50 providing conduction between the coupling portion (first electrode) C1 or C2 provided on the first substrate 2 and the coupling portion (second electrode) C3 or C4 provided on the second substrate 3. The conductive members 50 are positioned on the inner side of the seal material 600 and on the outer side of the first alignment film 51 and the second alignment film 52.

A light adjustment device of JP-A-2020-149021 includes a conductive pillar. As described above, when the outer shape of the light adjustment device is kept even while the conductive pillar is positioned on the outer side of a seal material, the area of an effective region (active area) in which a liquid crystal layer is provided potentially decreases since the seal material is disposed on the inner side. However, in the present embodiment, since the conductive member is positioned on the inner side of the seal material, the area of the effective region (active area) is larger than in a case in which the conductive member is positioned on the outer side of the seal material. In this manner, according to the present embodiment, the light adjustment device 100 having a larger area of the effective region (active area) can be provided.

The edges of the first alignment film 51 and the second alignment film 52 include the first edges 51a and 52b that are recessed inward. Each conductive member 50 is disposed at the corresponding gap portion 53 between the first edge 51a or 52b and the seal material 600.

Thus, each conductive member 50 can provide conduction between the coupling portion (first electrode) C1 or C2 provided on the first substrate 2 and the coupling portion (second electrode) C3 or C4 provided on the second substrate 3 at a position where the first alignment film 51 and the second alignment film 52 are not provided. Accordingly, conduction failure can be reduced.

The light adjustment panel 1 has a polygon shape having the side 311 (first side) and the side 313 (second side). One of the gap portions 53 and the corresponding conductive member 50 are disposed at the corner where the side 311 (first side) intersects the side 313 (second side).

Since each corner of a polygonal shape is a site protruding outward, the amount of outward protrusion increases when the conductive member 50 is disposed on the outer side of the seal material 600 at the corner. Thus, when the conductive member 50 is disposed on the inner side of the seal material 600, the increase in the amount of outward protrusion at the corner of the polygonal shape can be reduced while the conductive member 50 is disposed at the corner.

Second Embodiment

Figure 8:
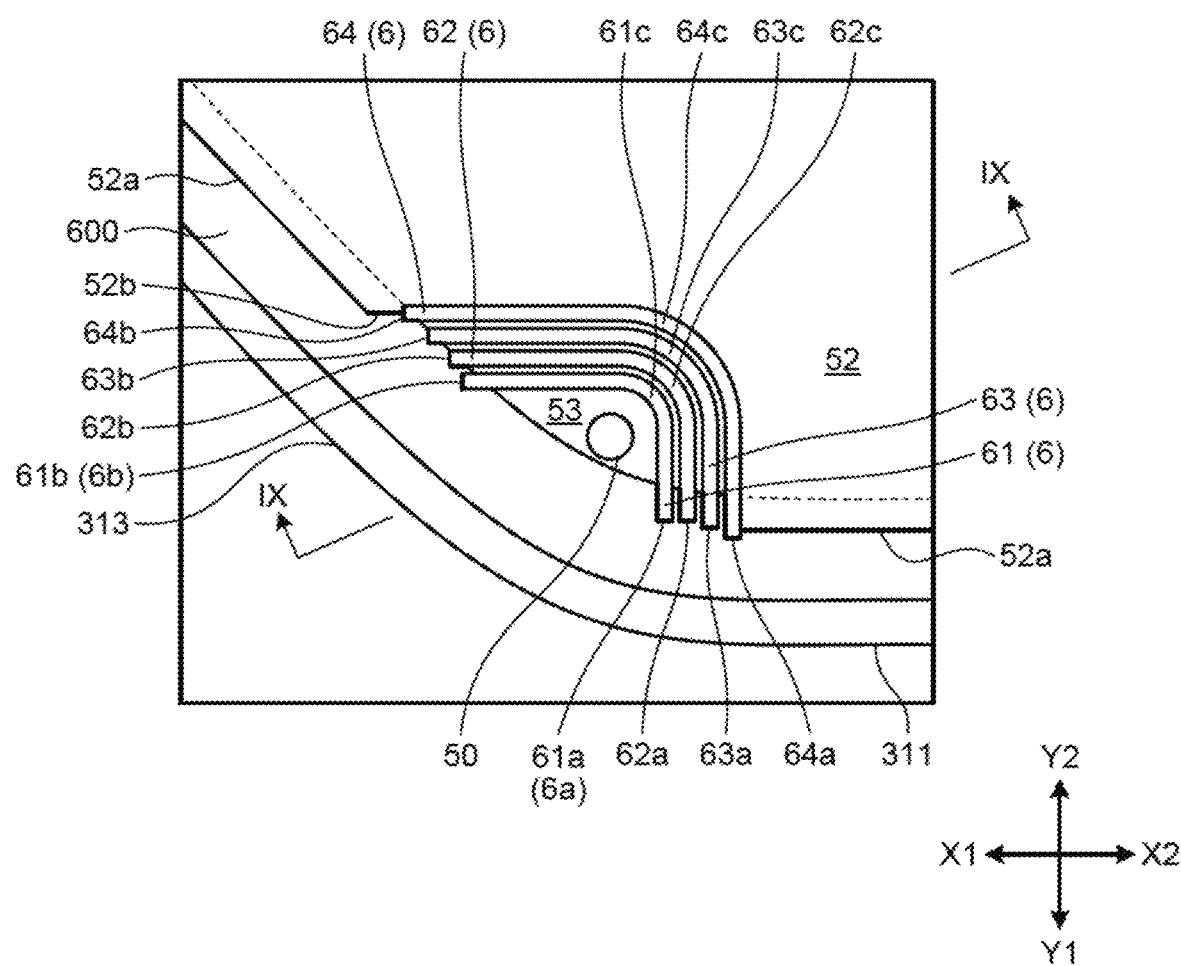
FIG. 8 is a schematic diagram of part of the front surface of a first substrate according to a second embodiment when viewed from the upper side and corresponds to FIG. 5.

FIG. 8 is a schematic diagram of part of the front surface of a first substrate according to a second embodiment when viewed from the upper side and corresponds to FIG. 5. FIG. 9 is a sectional view taken along line IX-IX in FIG. 8. FIG. 10 is a schematic sectional view for description of a process of forming an alignment film according to the second embodiment.

In the second embodiment, an infiltration prevention member 6 is provided at each gap portion 53. Detailed description thereof will be given below.

As illustrated in FIG. 8, four infiltration prevention members 6 are provided. Specifically, the infiltration prevention members 6 include an infiltration prevention member 61 (first infiltration prevention member), an infiltration prevention member 62 (second infiltration prevention member), an infiltration prevention member 63 (third infiltration prevention member), and an infiltration prevention member 64 (fourth infiltration prevention member). The four infiltration prevention members 6 are provided between each first edge 52b of the second alignment film 52 and the corresponding conductive member 50. The infiltration prevention members 61, 62, 63, and 64 are arranged at equal intervals in order from the side close to the conductive member 50. One end 6a and another end 6b of each infiltration prevention member 6 are coupled to the seal material 600. Each infiltration prevention member 6 protrudes in the Z direction. Each infiltration prevention member 6 has a substantially L shape when viewed in the Z direction.

The infiltration prevention member 61 extends from one end 61a to a middle part 61c toward the Y2 side, bends in a circular arc shape at the middle part 61c, and extends from the middle part 61c to another end 61b toward the X1 side. The one end 61a and the other end 61b are coupled to the seal material 600.

The infiltration prevention member 62 extends from one end 62a to a middle part 62c toward the Y2 side, bends in a circular arc shape at the middle part 62c, and extends from the middle part 62c to another end 62b toward the X1 side. The one end 62a and the other end 62b are coupled to the seal material 600.

The infiltration prevention member 63 extends from one end 63a to a middle part 63c toward the Y2 side, bends in a circular arc shape at the middle part 63c, and extends from the middle part 63c to another end 63b toward the X1 side. The one end 63a and the other end 63b are coupled to the seal material 600.

The infiltration prevention member 64 extends from one end 64a to a middle part 64c toward the Y2 side, bends in a circular arc shape at the middle part 64c, and extends from the middle part 64c to another end 64b toward the X1 side. The one end 64a and the other end 64b are coupled to the seal material 600. The infiltration prevention member 64 extends along the first edge 52b of the second alignment film 52. The four middle parts 61c, 62c, 63c, and 64c have circular arc shapes centered at the conductive member 50. The infiltration prevention members 61, 62, 63, and 64 have the same height.

As illustrated in FIG. 9, four infiltration prevention members 7 are provided at the second substrate 3. The four infiltration prevention members 7 include an infiltration prevention member 71 (first infiltration prevention member), an infiltration prevention member 72 (second infiltration prevention member), an infiltration prevention member 73 (third infiltration prevention member), and an infiltration prevention member 74 (fourth infiltration prevention member). The four infiltration prevention members 7 are provided between each first edge 52b of the second alignment film 52 and the corresponding conductive member 50. The infiltration prevention members 71, 72, 73, and 74 are arranged at equal intervals in order from the side close to the conductive member 50. The infiltration prevention members 7 overlap the infiltration prevention members 6 illustrated in FIG. 8 in the Z direction. Specifically, each infiltration prevention member 7 has a substantially L shape, and one end and the other end thereof are coupled to the seal material 600. The infiltration prevention members 7 protrude in the Z direction.

Specifically, the infiltration prevention member 71 is disposed on the Z2 side of the infiltration prevention member 61. The infiltration prevention member 71 protrudes to the Z1 side from the insulating film 44 provided on the second substrate 3. The infiltration prevention member 72 is disposed on the Z2 side of the infiltration prevention member 62. The infiltration prevention member 72 protrudes to the Z1 side from the insulating film 44 provided on the second substrate 3. The infiltration prevention member 73 is disposed on the Z2 side of the infiltration prevention member 63. The infiltration prevention member 73 protrudes to the Z1 side from the insulating film 44 provided on the second substrate 3. The infiltration prevention member 74 is disposed on the Z2 side of the infiltration prevention member 64. The infiltration prevention member 74 protrudes to the Z1 side from the insulating film 44 provided on the second substrate 3. The infiltration prevention member 74 contacts the first edge 52b of the second alignment film 52. The infiltration prevention members 71, 72, 73, and 74 have the same height.

In this manner, gaps of the same size in the Z direction are provided between respective pairs of the four infiltration prevention members 7 and the four infiltration prevention members 6. The spacers 610 and 611 are provided inside the seal material 600. The spacer 610 has the same height as the four infiltration prevention members 6. The spacer 611 has the same height as the four infiltration prevention members 7. The spacers 610 and 611 are photo-spacers provided in a photolithography process, metal films, or the like. Thus, the spacer 610 may be produced in the same process as the four infiltration prevention members 6. The spacer 611 may be produced in the same process as the four infiltration prevention members 7.

The following describes effects of the infiltration prevention members 6 with reference to FIG. 10. As illustrated in FIG. 9, the first alignment film 51 is provided on an insulating film 44. The first alignment film 51 is made of, for example, polyimide (PI). The first alignment film 51 can be formed by, for example, applying a polyimide polymer compound on the insulating film 44 and then drying the applied compound. As illustrated in FIG. 10, the polyimide polymer compound flows toward the X1 side when applied in a larger amount. However, since the infiltration prevention members 61, 62, 63, and 64 are provided, the flow of the polyimide polymer compound is held back by the infiltration prevention members 61, 62, 63, and 64 and does not flow to the coupling portion C1 (first electrode).

As described above, the infiltration prevention members 6 and 7 protruding in the Z direction (first direction) are provided between each of the first edges 51a and 52b and the conductive member 50.

In formation of the first alignment film 51 and the second alignment film 52, the polyimide polymer compound flows outward in a wide range when applied in a larger amount as described above with reference to FIG. 10, and potentially covers the coupling portion C1 (first electrode) and the coupling portion C3 (second electrode) between which the conductive member 50 provides conduction. When the coupling portions C1 and C3 are covered by the polyimide polymer compound, the probability of conduction failure between the conductive member 50 and the coupling portions C1 and C3 increases. However, in the present embodiment, since the infiltration prevention members 6 and 7 are provided, the flow of the polyimide polymer compound is held back by the infiltration prevention members 6 and 7 and prevented from flowing to the coupling portion C1 (first electrode) and the coupling portion C3 (second electrode). Accordingly, conduction failure between the conductive member 50 and the coupling portions C1 and C3 can be reduced.

The infiltration prevention members 6 and 7 continuously extend from the one end 6a to the other end 6b, surrounding the conductive member 50, and the one end 6a and the other end 6b are coupled to the seal material 600. Accordingly, even if the polyimide polymer compound flows toward the conductive member 50, the polyimide flow can be stopped by the infiltration prevention members 6 and 7.

A plurality of the infiltration prevention members 6 and 7 are provided at intervals from the first edges 51a and 52b toward the conductive member 50. Accordingly, the polyimide flow can be more reliably stopped by the infiltration prevention members 6 and 7 than in a case in which the numbers of infiltration prevention members 6 and 7 are each one.

What is claimed is:

1. A light adjustment device comprising a panel unit including a plurality of light adjustment panels stacked in a first direction, wherein
the light adjustment panels each include
a first substrate,
a second substrate overlapping the first substrate in a first direction,
a first alignment film provided on the first substrate,
a second alignment film provided on the second substrate and overlapping the first alignment film in the first direction,
a seal material provided between the first substrate and the second substrate and on the outer side of the first alignment film and the second alignment film,
a liquid crystal layer provided between the first alignment film and the second alignment film and sealed by the seal material, and
a conductive member providing conduction between a first electrode provided on the first substrate and a second electrode provided on the second substrate,
the first alignment film and the second alignment film each have a first edge that are recessed toward a center of each of the light adjustment panels,
the conductive member is positioned at a gap portion between the first edge and the seal material and is within an area sealed by the seal material,
a plurality of infiltration prevention members each protruding in the first direction is are provided between the first edge and the conductive member at the gap portion,
each of the infiltration prevention members has a substantially L shape and continuously extends from one end to the other end, and has both ends coupled to the seal material, and
the infiltration prevention members are provided on both sides of the first substrate and the second substrate,
a constant gap in the first direction is provided between:
the infiltration prevention members that are provided on a side of the first substrate and that have a same height; and
the infiltration prevention members that are provided on a side of the second substrate having and that have a same height, and
the infiltration prevention members on the side of the first substrate are provided and arranged at intervals, that is unfilled by the first alignment film, from the first edge toward the conductive member.

2. The light adjustment device according to claim 1, wherein
the light adjustment panels each have a polygonal shape having a first side and a second side adjacent to the first side, and
the gap portion and the conductive member are disposed at a corner where the first side intersects the second side.

3. The light adjustment device according to claim 1, wherein
when viewed from the first direction, a single conductive member is surrounded by the infiltration prevention members that are arranged in parallel and having a constant space between each other.

4. A light adjustment device comprising a panel unit including a plurality of light adjustment panels stacked in a first direction, wherein
the light adjustment panels each include
a first substrate,
a second substrate overlapping the first substrate in a first direction,
a first alignment film provided on the first substrate,
a second alignment film provided on the second substrate and overlapping the first alignment film in the first direction,
a seal material provided between the first substrate and the second substrate and on the outer side of the first alignment film and the second alignment film,
a liquid crystal layer provided between the first alignment film and the second alignment film and sealed by the seal material, and
a conductive member providing conduction between a first electrode provided on the first substrate and a second electrode provided on the second substrate,
the first alignment film and the second alignment film each have a first edge that are recessed toward a center of each of the light adjustment panels,
the conductive member is positioned at a gap portion between the first edge and the seal material and is within an area sealed the seal material,
a plurality of infiltration prevention members each protruding in the first direction is are provided between the first edge and the conductive member at the gap portion,
each of the infiltration prevention members has a substantially L shape and continuously extends from one end to the other end, and has both ends coupled to the seal material,
the infiltration prevention members are provided on both sides of the first substrate and the second substrate,
a constant gap in the first direction is provided between:
the infiltration prevention members that are provided on a side of the first substrate and that have a same height; and
the infiltration prevention members that are provided on a side of the second substrate and that have a same height, and
the infiltration prevention members on the side of the first substrate are provided and arranged at intervals from the first edge toward the conductive member,
when viewed from the first direction, a space is existed between the infiltration prevention members and between the infiltration prevention member and the first electrode.

5. The light adjustment device according to claim 4, wherein
when viewed from the first direction, a single conductive member is surrounded by the infiltration prevention members that are arranged having a constant space between each other.

* * * * *